US011588922B2

(12) United States Patent
Damale

(10) Patent No.: US 11,588,922 B2
(45) Date of Patent: Feb. 21, 2023

(54) CAPTURING AND REPLAYING APPLICATION SESSIONS USING RESOURCE FILES

(71) Applicant: Acoustic, L.P., New York, NY (US)

(72) Inventor: Shridhar Damale, San Francisco, CA (US)

(73) Assignee: Acoustic, L.P., New York, NY (US)

( * ) Notice: Subject to any disclaimer, the term of this patent is extended or adjusted under 35 U.S.C. 154(b) by 484 days.

(21) Appl. No.: 16/727,758

(22) Filed: Dec. 26, 2019

(65) Prior Publication Data

US 2020/0137196 A1   Apr. 30, 2020

Related U.S. Application Data

(60) Continuation of application No. 15/459,092, filed on Mar. 15, 2017, now Pat. No. 10,523,784, which is a division of application No. 13/834,963, filed on Mar. 15, 2013, now Pat. No. 9,635,094.

(60) Provisional application No. 61/714,020, filed on Oct. 15, 2012.

(51) Int. Cl.
*H04L 67/75* (2022.01)
*H04L 67/10* (2022.01)
*H04L 67/50* (2022.01)
*H04L 67/02* (2022.01)
(Continued)

(52) U.S. Cl.
CPC .............. *H04L 67/75* (2022.05); *H04L 67/02* (2013.01); *H04L 67/10* (2013.01); *H04L 67/14* (2013.01); *H04L 67/535* (2022.05); *H04L 67/01* (2022.05)

(58) Field of Classification Search
CPC ........ H04L 67/36; H04L 67/02; H04L 67/10; H04L 67/14; H04L 67/22; H04L 67/42; H04L 67/535; H04L 67/01; H04L 67/75
See application file for complete search history.

(56) References Cited

U.S. PATENT DOCUMENTS 10,523,784 B2 * 12/2019 Damale ................... H04L 67/22
11,184,406 B1 * 11/2021 Shashank ............ H04L 67/1095
(Continued)

*Primary Examiner* — Scott T Baderman
*Assistant Examiner* — Mario M Velez-Lopez
(74) *Attorney, Agent, or Firm* — Mauriel Kapouytian Woods LLP; Benjamin Charkow; Elaine K. Lee

(57) ABSTRACT

A capture and replay system identifies images displayed during an application session. A parser may generate Hypertext Markup Language (HTML) code from an application resource file or from the JSON post made by the application. A replay engine may use the HTML code to recreate at least some of the screens displayed during the application session. The capture and replay system may dynamically identify images that are not reproduced from the resources database and request an agent/(s) to asynchronously upload the image files associated with the images. The replay engine may use the uploaded image files to replay the application session. The capture and replay system may capture application sessions more efficiently by reproducing images from the resource file instead of capturing the images during the original application session and by dynamically requesting image files for the images were are not previously reproduced from the resource file. Once an image file is uploaded to server, it does not need to be requested again from any other agent.

26 Claims, 9 Drawing Sheets

(51) Int. Cl.
*H04L 67/14* (2022.01)
*H04L 67/01* (2022.01)

(56) References Cited

U.S. PATENT DOCUMENTS

| | | | |
|---|---|---|---|
| 2007/0011321 A1* | 1/2007 | Huntington | H04L 43/062 709/224 |
| 2007/0255754 A1* | 11/2007 | Gheel | G06F 16/955 |
| 2009/0280859 A1* | 11/2009 | Bergh | G06F 16/5838 455/556.1 |
| 2009/0300483 A1* | 12/2009 | Viet | G06F 40/143 715/236 |
| 2009/0328028 A1* | 12/2009 | O'Rourke | G06F 8/65 717/173 |
| 2011/0029665 A1* | 2/2011 | Wenig | H04L 67/142 709/224 |
| 2011/0173239 A1* | 7/2011 | Sayed | G06F 11/3414 718/1 |
| 2012/0173966 A1* | 7/2012 | Powell | G06F 16/93 715/234 |
| 2013/0132833 A1* | 5/2013 | White | G06F 3/048 715/704 |
| 2013/0136253 A1* | 5/2013 | Liberman Ben-Ami | H04M 3/5191 379/265.09 |
| 2013/0218315 A1* | 8/2013 | Jaeger | G06F 3/16 700/94 |
| 2014/0109047 A1* | 4/2014 | Yu | G06F 8/70 717/120 |
| 2014/0115712 A1* | 4/2014 | Powell | G06F 21/6263 726/26 |

\* cited by examiner

CAPTURING AND REPLAYING APPLICATION SESSIONS USING RESOURCE FILES

The present application is a continuation of Ser. No. 15/459,092, filed Mar. 15, 2017, which is a divisional of Ser. No. 13/834,963, filed Mar. 15, 2013, which claims priority to provisional patent application Ser. No. 61/714,020, filed Oct. 15, 2012, which are incorporated by reference in their entirety.

BACKGROUND

Intelligent networked devices, such as smart phones, tablet computers, personal computers, etc. present new challenges when trying to understand user behavior and experiences during application sessions. The intelligent devices may use new classes of mobile applications that leverage distributed code, local databases, and intermittent network communications.

A monitoring system may monitor and analyze an application session performed on the device. An agent operating in the device may continuously capture images displayed on a screen of the device and may capture user inputs entered into the device during the application sessions. The agent may send the captured screen images and user inputs to a server. The server may replay the captured application session by displaying the captured images along-side the captured user inputs.

In order to correctly evaluate a user experience during the application session, a replay system may try to recreate the images displayed on the device during the original application session and recreate the user inputs entered into the device during the original application session.

Some devices may have limited processing and transmission bandwidth. Thus, a monitoring system operating on the device may have problems capturing the large amounts of image data displayed during application sessions. For example, the monitoring systems may slow down the device and disrupt the application session.

BRIEF SUMMARY

A capture and replay system identifies images displayed during an application session. A parser may generate Hypertext Markup Language (HTML) code from an application resource file or from the JSON post made by the application. A replay engine may use the HTML code to recreate at least some of the screens displayed during the application session. The capture and replay system may dynamically identify images that are not reproduced from the resources database and request an agent/(s) to asynchronously upload the image files associated with the images. The replay engine may use the uploaded image files to replay the application session. The capture and replay system may capture application sessions more efficiently by reproducing images from the resource file instead of capturing the images during the original application session and by dynamically requesting image files for the images were are not previously reproduced from the resource file. Once an image file is uploaded to server, it does not need to be requested again from any other agent.

DETAILED DESCRIPTION

Figure 1:
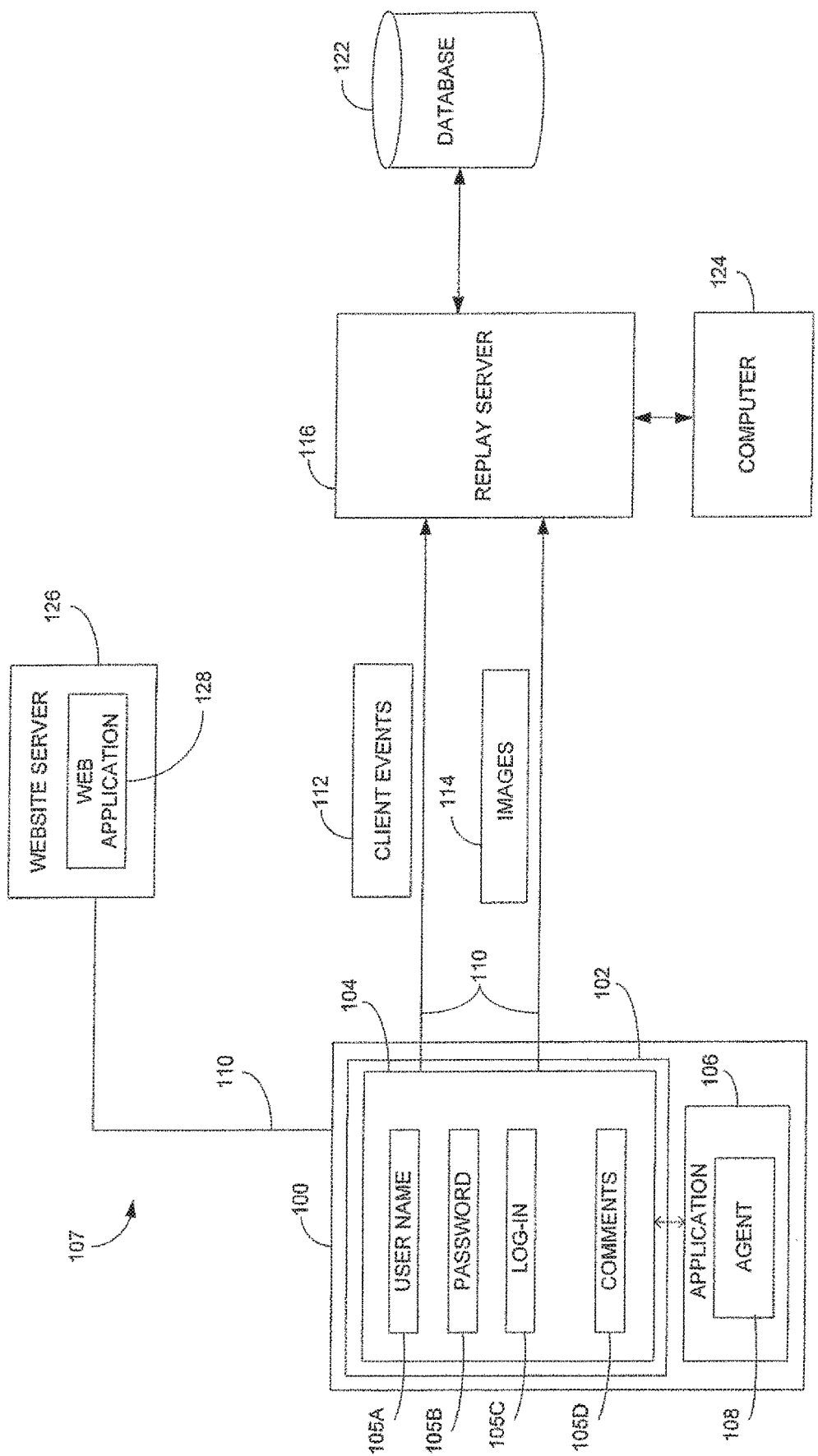
FIG. 1 depicts an example of a system for capturing and replaying application sessions.

FIG. 1 depicts an example of a client device 100 operating an application 106. Client device 100 may comprise a smart phone, a Personal Digital Assistant (PDA), a terminal, a personal computer, a laptop computer, a tablet computer, a notebook computer, or any other type of computing device that operates application 106.

A network 110 may operably couple client device 100 to a website server 126 and to a replay server 116. Network 110 may be any combination of Internet networks, Local Area Networks (LANs), Wide Area Networks (WANs), Public Service Telephone Networks (PSTNs), cellular networks, or the like, or any combination thereof.

Application 106 may be any combination of software and/or hardware that conducts any type of application session 107. For simplicity, only one application 106 is shown in FIG. 1. However, it should be understood that client device 100 may execute any variety of different applications 106.

Application 106 may perform different functions on client device 100. For example, a user may use application 106 to purchase items or services, play video games, provide digital navigation, search the internet, etc. These of course are just examples of any variety of functions performed by application 106.

In one example, application 106 may comprise a server based application that operates within a web browser environment and communicates with a web application 128 operating on website server 126. In another example, application 106 may comprise a native application that at times operates independently of web application 128 and at other times exchanges information with web application 128.

Application 106 is shown displaying an image 104 within a screen 102 on client device 100. In this example, image 104 may comprise an electronic page including a field 105A for entering a user name, a field 105B for entering a password, an icon 105C for initiating a login operation, and a field 105D for entering comments. A user may enter information into fields 105A, 105B, and 105D and select icon 105C to initiate a login process with application 106.

After logging in, the user may use application 106 to conduct an application session 107 with web application 128. For example, application 106 may send inventory requests or purchase requests for particular items to web application 128. Web application 128 may send webpages back to client device 100 showing available products and/or confirming the completion of an online transaction.

An agent 108 may be embedded in application 106 and capture client events 112 during application session 107. Agent 108 may send the captured client events 112 to replay server 116. Client events 112 may contain data and states created or entered locally on client device 100. For example, client events 112 may identify text entered into fields 105A, 105B, and 105D, and identify a user input selecting icon 105C. In another example, client events 112 also may include images 114, such as, binary screen shots displayed on screen 102 during application session 107.

Replay server 116 may store captured client events 112 and images 114 in a database 122 and display the captured images 114 on a computer 124 in a sequence similar to what was previously displayed during original application session 107. Other client events 112, such as the user inputs, may be displayed on computer 124 along-side images 114.

The binary screen shots contained in images 114 may comprise a substantial amount of data. Agent 108 may use a substantial amount of processing bandwidth in client device 100 to capture images 114. The additional bandwidth requirements may slow down client device 100 and/or application 106. For example, application 106 may take longer to load webpages and disrupt normal user experiences during application session 107.

Images 114 may comprise bitmap images of webpages. Client events 112 may contain user inputs that enter data into fields of the webpages. However, replay server 116 may not be able to insert the user inputs in the bitmap images. Thus, replay server 116 may not be able to accurately reproduce some states for application session 107.

Figure 2:
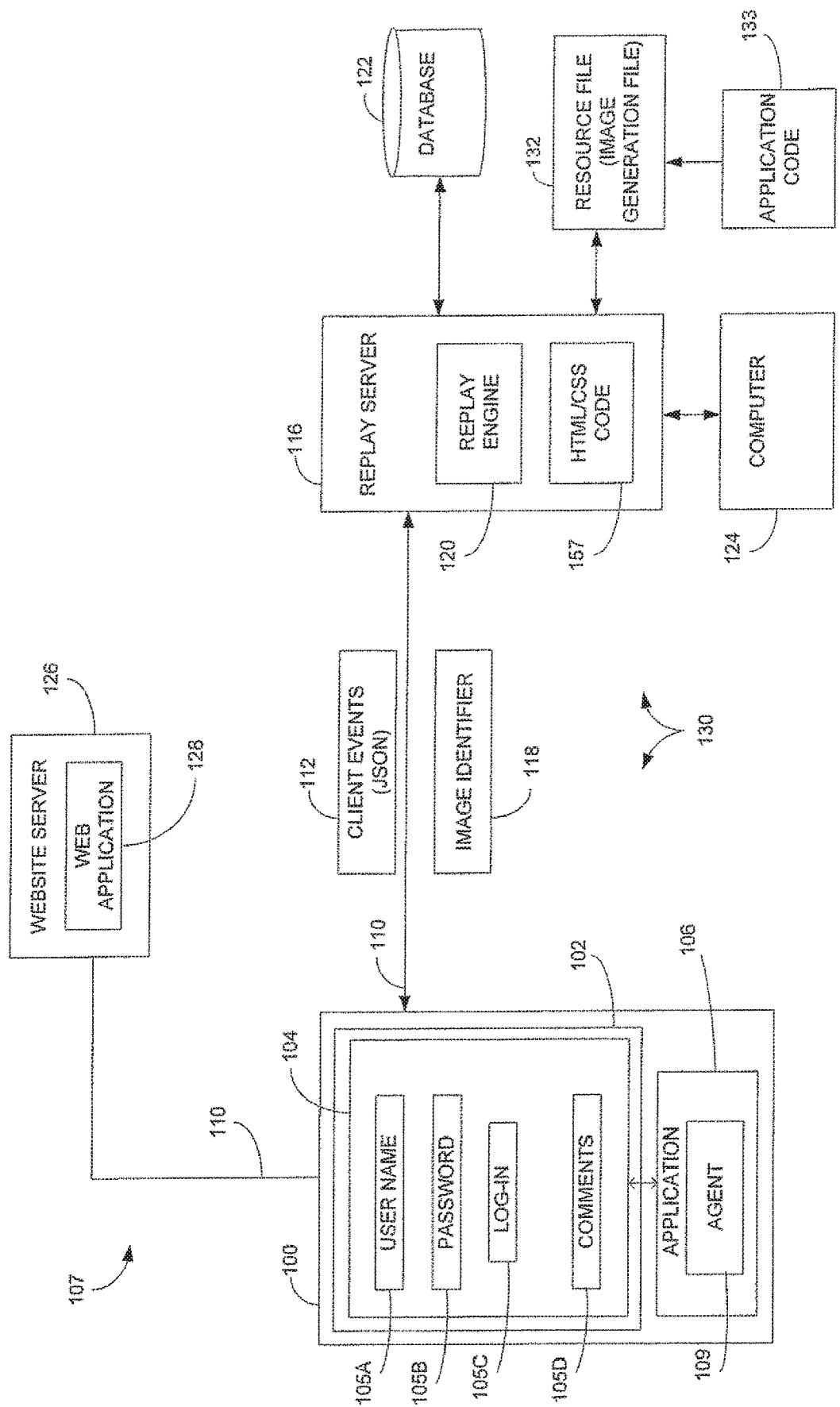
FIG. 2 depicts an example of a capture and replay system that uses resource files to recreate images from application sessions.

FIG. 2 depicts a capture and replay system 130 that may more efficiently and/or more accurately capture and replay application sessions, such as application session 107. Instead of capturing binary screen shots from screen 102, capture and replay system 130 may recreate images from a resource file 132 associated with application 106.

Application 106 may comprise executable software that runs on client device 100 and conducts application session 107. Application code 133 may comprise uncompiled software code for implementing application 106. For example, application code 133 may comprise Objective C or Java code.

Resource file 132 may alternatively be referred to as an image generation file and may comprise software code used by application code 133 for generating application 106. For example, resource file 132 may comprise a collection of Extensible Markup Language (XML) code used by application 106 to display icons, menus, dialog boxes, string, tables, text box locators, button locators, user-defined binary data, or any other type of data.

A compiler (not shown) may compile application code 133 with resource file 132 to create application 106. Once compiled, application code 133 and resource file 132 may be embedded directly into a single executable file (EXE) for application 106 containing both code and image resources.

Agent 109 may send captured client events 112 in a JSON format to replay server 116. Client events 112 may identify any navigation, history, sequence, and/or state of application session 107. Client events 112 also may include image data, such as a height, a width, and a location of webpage elements. Client events 112 also may contain text, names, field identifiers, location identifiers, image data, Document Object Models (DOMs), mouse clicks, keyboard entries, metadata, or any other data that may be associated with a user input or application state for application session 107.

Agent 109 or replay server 116 also may add timestamps to client events 112 that identify the sequence of electronic pages displayed during the application session 107, the sequence of user inputs entered into the electronic pages, how long the electronic pages and images are displayed during the application session, and how long a user takes to enter inputs into fields of the electronic pages.

Agent 109 may comprise a software library compiled with application code 133. In one example, the software libraries may use JavaScript, Java, and/or Objective C to implement agent 109. However, the software libraries may use any code format.

Replay server 116 may generate Hyper-Text Markup Language (HTML) and Cascading Style Sheet (CSS) code 157 from resource file 132. Replay server 116 then may merge client events 112 with the HTML and CSS 157 generated from resource file 132 to recreate and replay the images and states for application session 107.

Some electronic images, or portions of electronic images, may not exist or may not be defined in resource file 132. For example, some control fields may be dynamically created at application session runtime. Agent 109 may capture image information missing from resource file 132 and include the captured image information as part of client events 112.

For example, application 106 may notify agent 109 when a new control field is created and displayed during application session 107. Agent 109 may generate client events 112 that identify the state change associated with the control field, contain a tag identifying the control field, contain a timestamp identifying when the control field was identified, and contain any user inputs entered or applied to the control field. Replay engine 120 then may apply the control field attributes to the webpage generated from the resource file 132.

In another example, agent 109 may dynamically upload image files to replay server 116. For example, agent 109 may detect a new image displayed on client device 100. Agent 109 may send an image file identifier 118 to replay server 116 that uniquely identifies the image file associated with the displayed image. Replay server 116 may search through database 122 for an image file matching image identifier 118. If no associated image file is located in database 122, replay server 116 may request agent 109 to upload the image file. Agent 109 may dynamically send the identified image file to replay server 116 in response to the request. Replay server 166 then may store and use the uploaded image file for replaying application session 107.

A same image may be displayed during a second application session 107. Agent 109 may generate and send a same image identifier 118 associated with the image to replay server 116. Replay server 116 again may check database 122 for an associated image file. The image file was previously sent by agent 109 to replay server 116 during the first application session 107. Thus, replay server 116 will not send a request back to agent 109 to upload the image file.

Replay server 116 reduces the image capture and processing requirements of processing agent 109 by using resource file 132 recreate some of the images from application session 107. The reduced processing requirements may prevent agent 109 from slowing down client device 100 and/or application session 107. Images that cannot be recreated from the resource file may be dynamically requested from the agent 109. Once uploaded to replay server 116, agents 109 no longer need to resend the same image file to replay server 116.

As discussed above, some replay systems may display user inputs adjacent to screen bitmap images. Replay server 116 may apply captured client events 112 to the HTML and CSS created from resource file 132 and possibly recreate states that were previously not reproducible using captured bitmap images.

Figure 3:
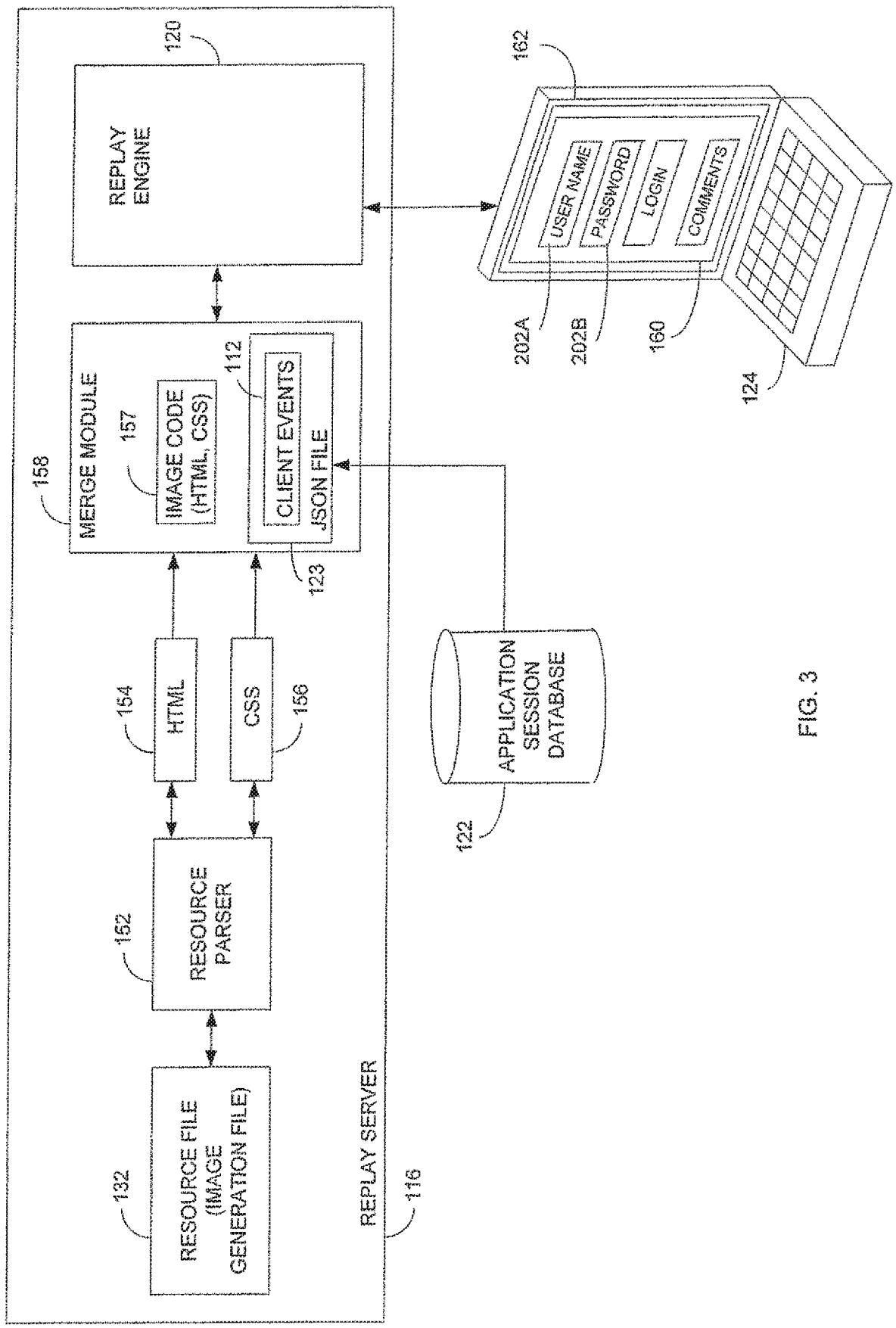
FIG. 3 depicts an example replay server used by the capture and replay system.

FIG. 3 depicts in more detail operations performed by replay server 116. Replay server 116 may obtain resource file 132 from the entity, such as a business, associated with application 106 in FIG. 2. A resource parser 152 may generate image code from resource file 132. In one example, image code may include a common HTML format 154 and/or Cascading Style Sheets (CSS) 156 understood by a browser. For explanation purposes, image code is alternatively referred to generally as HTML 157 and/or HTML file 157. However, it should be understood that image code 157 may comprise any code, image data, or any other information extracted and/or generated from resource file 132.

In one example, a first resource parser 152 may generate HTML and CSS from resource files 132 for applications operating in an Android® operating system and a second resource parser 152 may generate HTML and CSS from resource files 132 for applications operating in an Apple® operating system. However, resource parser 152 may generate image code for any operating system.

A merge module 158 may merge client events 112 in JSON file 123 with HTML 157. Replay engine 120 may replay merged HTML 157 and client events 112 to recreate the application session. For example, merge module 158 may generate JavaScript that applies user inputs contained in client events 112 to the HTML 154 and CSS 156 generated from resource file 132.

HTML 157 extracted from resource file 132 may provide boot-up and starting states for the replayed application session. For example, HTML 157 may render a webpage initially displayed during application session 107. Client events 112 then may identify modifications, inputs, and other run-time information associated with the rendered webpage.

For example, one of client events 112 may contain an identifier associated with a webpage 160. Replay engine 120 may use HTML 157 associated with the identifier to render webpage 160. Replay engine 120 then may apply user inputs contained in client events 112 to webpage 160. For example, replay engine 120 may enter text identified in client events 112 into fields 202A and 202B of webpage 160.

Figure 4:
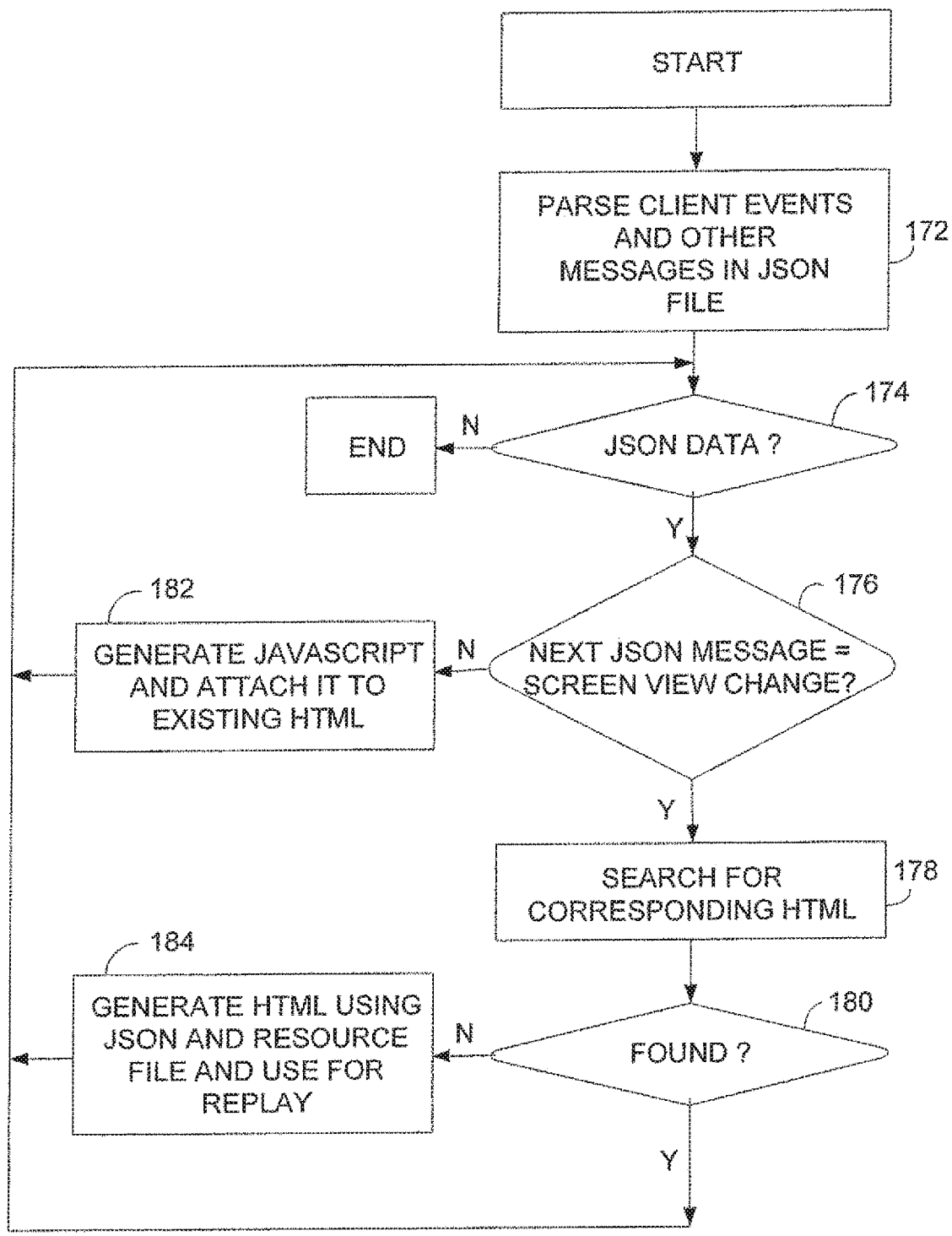
FIG. 4 depicts an example process for recreating an application session using a resource file.

FIG. 4 depicts one example process for using a resource file and client events to generate software code for replaying an application session. Operation 172 may parse through client events or any other messages captured during the application session. Operation 174 may identify a next client event in the JSON file.

The replay server in operation 176 may determine if the client event is associated with a screen view change. A screen view change may represent a change in the image displayed on the client device during the application session. For example, the replay server may associate a screen view change with a client event containing a new webpage identifier. The new webpage identifier may identify a new webpage and therefore indicate a change in the image currently displayed on the screen of the client device during the application session.

When no screen view change is identified in operation 176, the replay server in operation 182 may generate and attach code to existing HTML. For example, the identified client event may comprise a user input that enters data into a field of a currently displayed webpage. Operation 182 may generate code, such as JavaScript, that enters or displays the data from the user input into a field of the currently displayed webpage. In one example, the application session may be replayed on client device 100 in FIG. 2 instead of computer 124 in FIG. 3. In this example, the replay server may generate code in a native language of application 106 in FIG. 2.

Table 1.0 shows example client events contained in a JSON file that may identify a button icon with text "Log-In" and an identifier (id) of "103". The client events also may indicate the button is clicked.

TABLE 1.0

```
{
    "type": 4,
    "sereenviewOffset": 18505,
    "fromWeb": "false",
    "target": {
        "tlType": "button",
        "type": "UIRoundedRectButton",
        "id": "103",
        "visitedCount": 1,
        "position": {
            "y": 176,
            "width": 100,
            "x": 110,
            "height": 37
        },
        "currState": {
            "text": "Log-In"
        },
        "prevState": {
            "text": "Log-In"
        }
    },
    "offset": 19413,
    "event": {
        "tlEvent": "click",
        "type": "pressedButtonLogin"
    }
},
```

The replay server may generate the following JavaScript based on the above JSON file.

```
var elem = document.getElementById("103");
if( elem != null )
{
    elem.click();
}
```

The replay server in operation 176 may identify a client event in the JSON file associated with a screen view change. For example, the client event in the JSON file may indicate selection of a Hypertext Transfer Protocol (HTTP) link that displays a new webpage on the client device.

Operation 178 may search through the HTML and CSS generated from the resource file for the associated screen view change. For example, the client event may contain a new webpage identifier and operation 178 may search for HTML associated with the webpage identifier. During replay, the replay server may use the HTML identified in operation 180 to render the new webpage.

The replay server in operation 180 may not find HTML associated with the screen view change. For example, the application may generate the screen change at runtime during the original application session. The replay server may not be able to reproduce the screen view change solely from the resource file HTML.

Operation 184 may generate HTML for the screen view change using a combination of client events in the JSON file and other data from the resource file. For example, the client events may identify a change in the color of a field displayed within a webpage. Operation 184 may generate HTML that changes the color of the field based on image information contained in the client events in the JSON file. For example, the client event may identify a location and a color for the field.

As described above in table 1.0, example client events in the JSON file may identify a button icon having associated text "Log-In" and an associated identifier (id) "103." The client events from the JSON file also may indicate the button icon is clicked and identify the position of the button icon as x=110 and y=176 with a width and height of 100 and 37, respectively.

The replay server in operation 184 may generate the example HTML in Table 2.0 based on the client events in the JSON file shown in Table 1.0. The HTML in table 2.0 may render an image showing the selection of the button icon.

TABLE 2.0

```
<!DOCTYPE html>
<html>
<head>
<style type="text/css">
    .id100 {
        position: absolute;
        top: 176px;
        left: 110px;
        width: 100px;
        height: 37px;
    }
</style>
<script>
var elem = document.getElementById("103");
if( elem != null)
{
    elem.click();
}
</script>
</head>
<body>
<input type="button" id="103" class="id100" value="Log-In"></input>
</body>
</html>
```

The replay server in operation 174 may parse through the remainder of the client events in the JSON file. The replay server may use the HTML from the resource file and the client events from the JSON file to generate JavaScript and HTML for recreating and replaying the different states of the original application session.

Figure 5C:
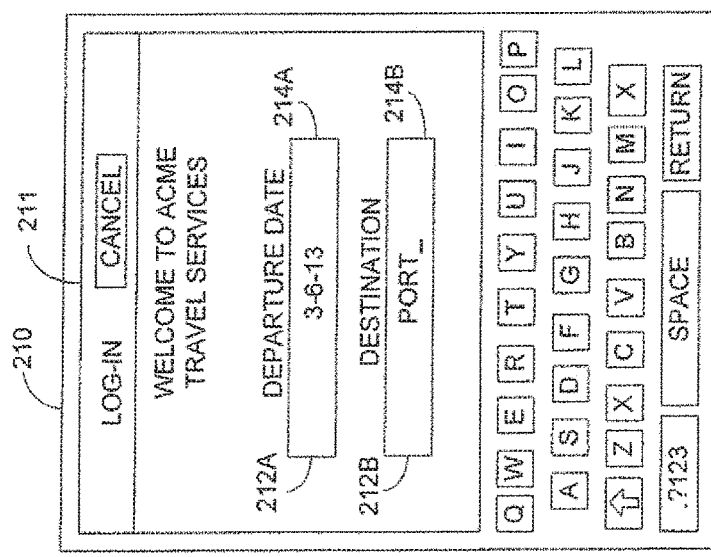
FIGS. 5A-5C depicts an example of a replayed application session.
Figure 5B:
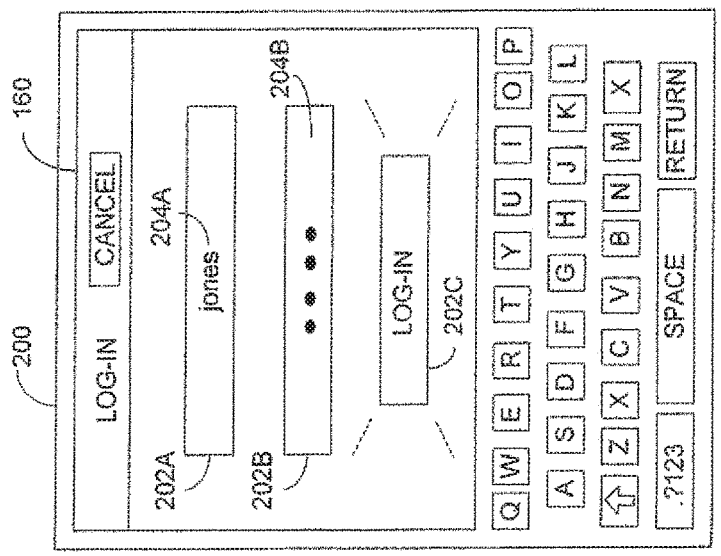
Figure 5A:
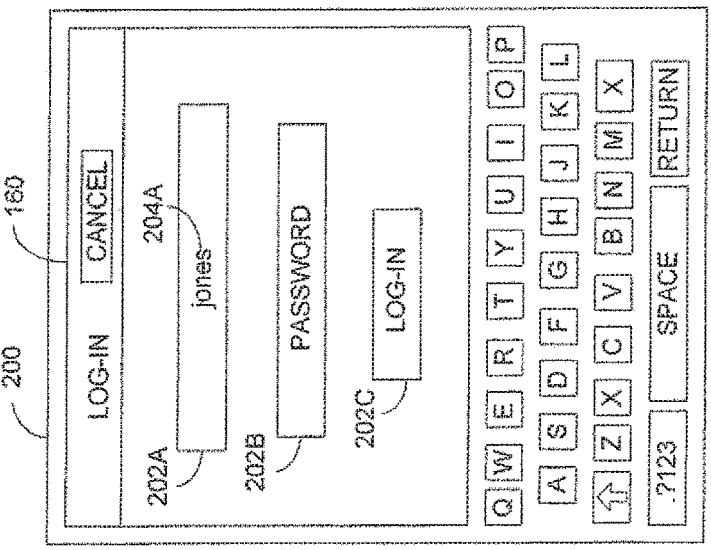

FIGS. 5A-5C depicts one example of how the replay engine may replay an application session. In FIG. 5A, the replay engine may display an image 200. In one example, image 200 may display webpage 160 previously loaded on the client device during the application session. Image 200 may be rendered from the HTML that was created from the resource file. Image 200 also may include fields 202A-202C.

The replay engine may identify a client event associated with webpage 160. For example, the client event may enter a name 204A into field 202A. The replay engine may generate code that applies the client event to webpage 160. For example, the replay engine may render image 200 with name 204A entered into field 202A.

FIG. 5B shows another replay state. The replay engine may replay an additional client event that enters a password 204B into field 202B. In one example, an additional state occurred during the original application session. For example, logic in webpage 160 may have changed the color of log-in field 202C in response to entry of name 204A and password 204B. The color change may visually prompt the user to select field 202C for completing a log-in process. The color change for log-in field 202C may have happened at runtime during the original application session and may not be contained in the HTML generated from the resource file.

The agent 109 of FIG. 2 may have created a client event during the original application session that identifies the color change for log-in field 202C. The agent also may have included a timestamp in the client event indicating the color change happened after name 204A was entered into field 202A and password 204B was entered into field 202B. The replay server may generate replay code based on the client event that changes the color of field 202C in webpage 160. During replay, the replay engine may use the code to display image 200 with the color change for field 202C.

FIG. 5C shows another image 210 displayed during replay. In this example, image 210 may comprise a webpage 211 displayed during the previously captured application session. The replay engine may use HTML generated from the resource file to render image 210. Additional client events may be associated with webpage 211. For example, webpage 211 may contain fields 212A and 212B. Client events associated with webpage 211 may contain user inputs that enter text 214A and 214B into fields 212A and 212B, respectively. The replay server may generate code based on the client events that enter text 214A and 214B into fields 212A and 212B, respectively. The replay engine then may use the code during replay to display image 210.

Figure 6:
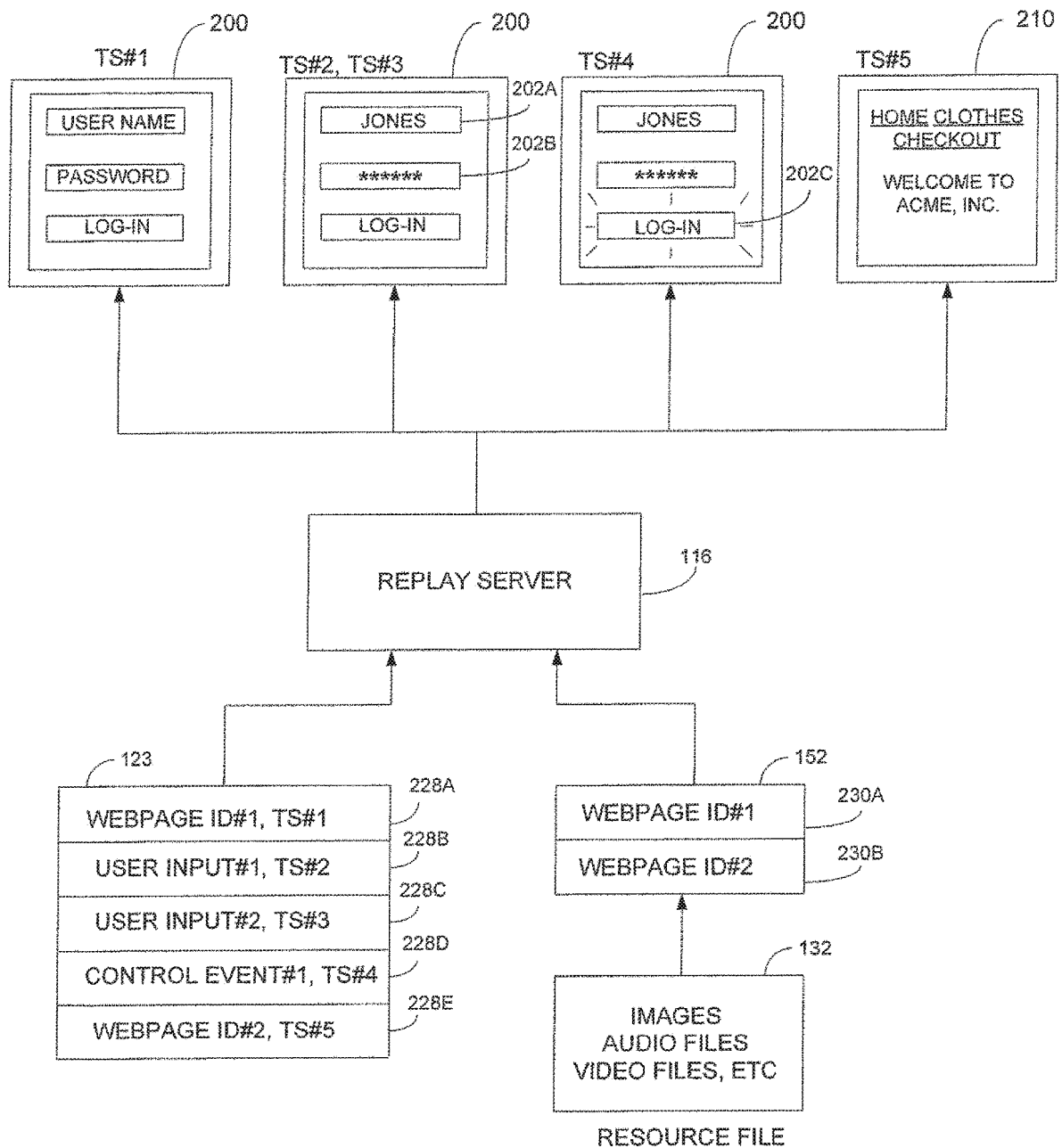
FIG. 6 depicts an example how client events are used for replaying the application session.

FIG. 6 depicts in more detail one example of how replay server 116 may replay the application session shown in FIGS. 5A-5C. The agent may have captured client events 228A-228E during the application session and formatted the client events into JSON file 123. An example list of client events 228A-228E may include a first webpage identifier ID #1, a first user input #1, a second user input #2, a control event #1, and a second webpage identifier ID #2, respectively.

Client events 228 may be assigned associated timestamps (TS). For example, client event 228A may be assigned a timestamp value TS #1, client event 228B may be assigned a timestamp value TS #2, client event 228C may be assigned a timestamp value TS #3, etc. The timestamp values may identify the order that client events 228 were detected and/or captured during the application session. For example, client event 228B may have been detected or captured after client event 228A. The timestamp values may identify a time of day, count value, or any other value that identifies a sequence for client events 228 and replay server 116 may replay client events 228 in the sequence associated with the timestamp values.

As explained above, replay server 116 may have previously converted image data in resource file 132 into HTML and/or CSS code 230 in HTML file 152. Replay server 116 may merge client events 228 in JSON file 123 with HTML 230 in HTML file 152. For example, replay server 116 may identify a new webpage ID #1 in client event 228A. Replay server 116 may determine HTML or CSS 230A is associated with webpage ID #. Replay server 116 then may render image 200 based on HTML 230A associated with webpage ID #1.

User input #1 contained in client event 228B and user input #2 contained in client event 228C may identify text 202A and 202b entered into fields of webpage ID #1. Replay server 116 may generate JavaScript that renders webpage ID #1 with the fields populated with text 202A and 202b.

Client event 228D may contain a control event #1. Replay server 116 may identify control event #1 as an image change event that does not have corresponding HTML or CSS in HTML file 152. For example, control software in webpageID #1 may have changed the color of field 202C in response to user input #1 and/or user input #2. Replay server 116 may generate HTML based on client event 228D that displays the color change in field 202C.

The next client event 228E may contain webpage identifier ID #2. Replay server 116 may search HTML file 152 for HTML or CSS associated with webpage ID #2. In this example, replay server may identify HTML 230B as associated with webpage ID #2. Replay server 116 then may use HTML 230B to render a next image 210 displaying webpage ID #2.

Figure 7:
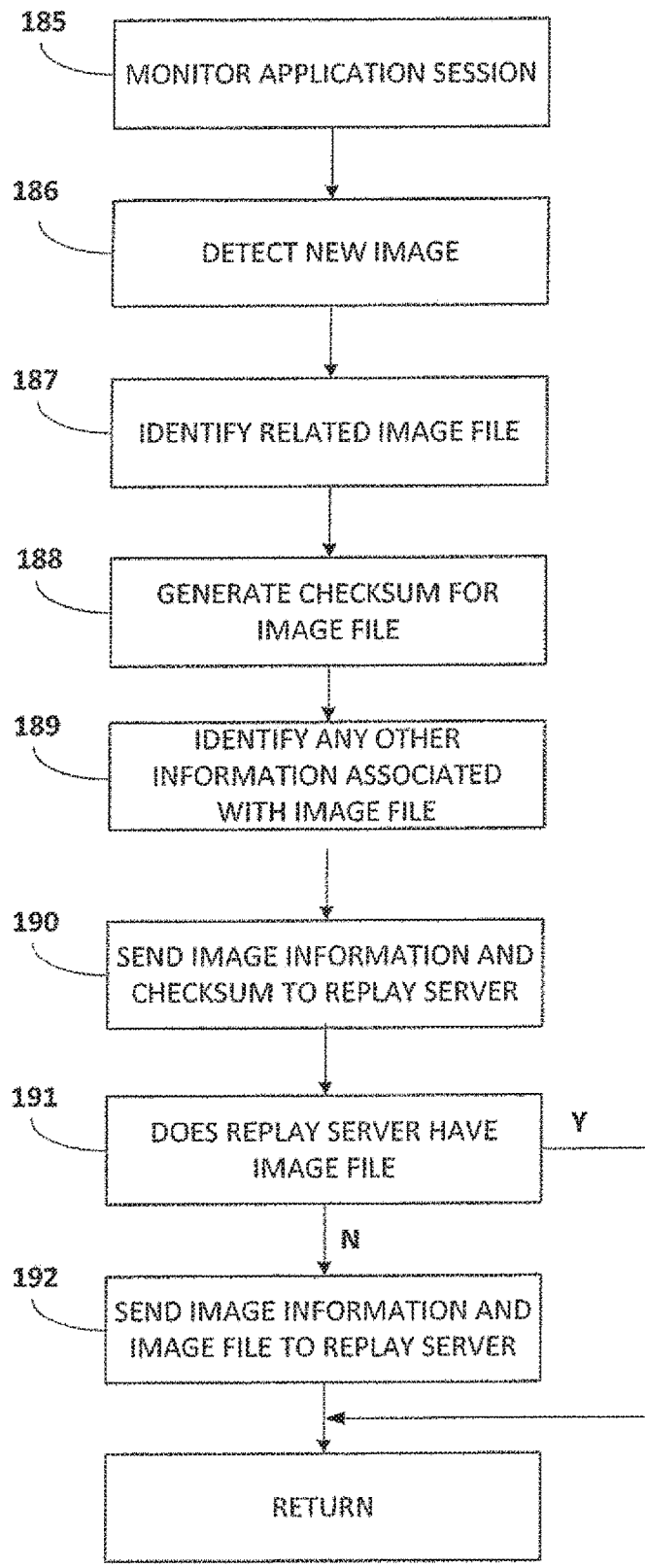
FIG. 7 depicts an example of how a client device may dynamically capture and transmit image files.

FIG. 7 depicts an example process for dynamically sending image files to the replay server. In operation 185, the agent may monitor the application session. In operation 186, the agent may detect a new image displayed during the application session. In operation 187, the agent may identify an image file associated with the displayed image. For example, the agent may search the application operating on client device 100 for the associated image file.

In operation 188, the agent may generate a checksum for the identified image file. For example, the agent may use a Message-Digest algorithm 5 (MD5) or a Secure Hash Algorithm (SHA2) to generate a checksum value from the image file. In operation 189, the agent may identify other information associated with the displayed image. For example, the agent may identify a screen view offset value, image type, image identifier, and/or position information associated with the displayed image.

In operation 190, the agent may send the checksum and any other associated image information to the replay server. When the image file is not currently in the replay server database, the agent may receive a message back from the replay server requesting the image file. If the agent receives a message in operation 191 requesting the image file, the agent in operation 192 may send the image file and any other related image information to the replay server. Operation 192 may send the image file asynchronous from web session 107.

Figure 8:
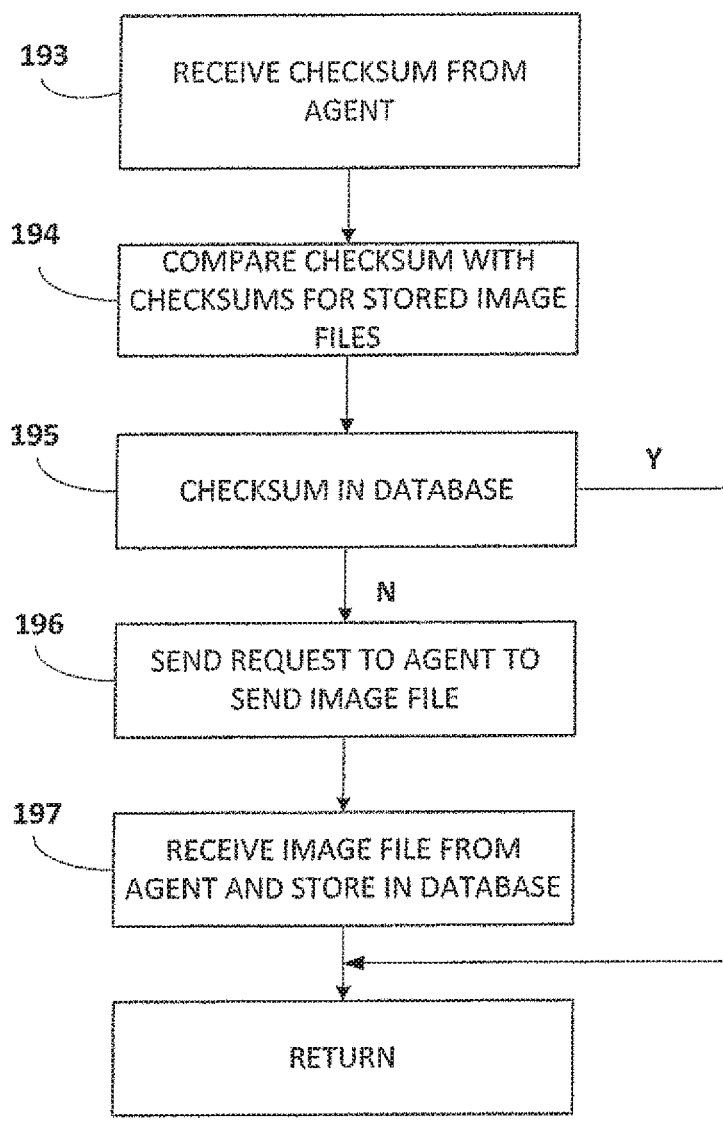
FIG. 8 depicts an example of how a replay server may dynamically request and receive image files from a client device.

FIG. 8 depicts an example process for dynamically requesting image files from an agent. In operation 193, the replay server may receive a checksum value from an agent. Again, the checksum value is generated from and uniquely identifies an associated image file. In operation 194, the replay server may compare the received checksum value with checksum values associated with previously stored image files.

In operation 195, the replay server may identify an image file in the replay server database associated with the received checksum value. When an associated image file is identified, the replay server may not need the agent to send the same image file. Accordingly, the replay server may not request the agent to send the image file.

In operation 195, the replay server may not identify an image file in the replay server database associated with the received checksum value. The replay server in operation 196 may send a message back to the agent requesting the image file. In operation 197, the replay server receives the image file from the agent and stores the image file in the replay server database. Operation 197 may receive the image file from the agent asynchronous from web session 107.

The replay server then may use the image file to reproduce the images previously displayed during the application sessions. For example, the replay server may replay an application session. The client events for the replay session may identify the checksum value. The replay server may search the replay database for the image file associated with the checksum value. The replay server then may render the image using the identified image file.

Figure 9:
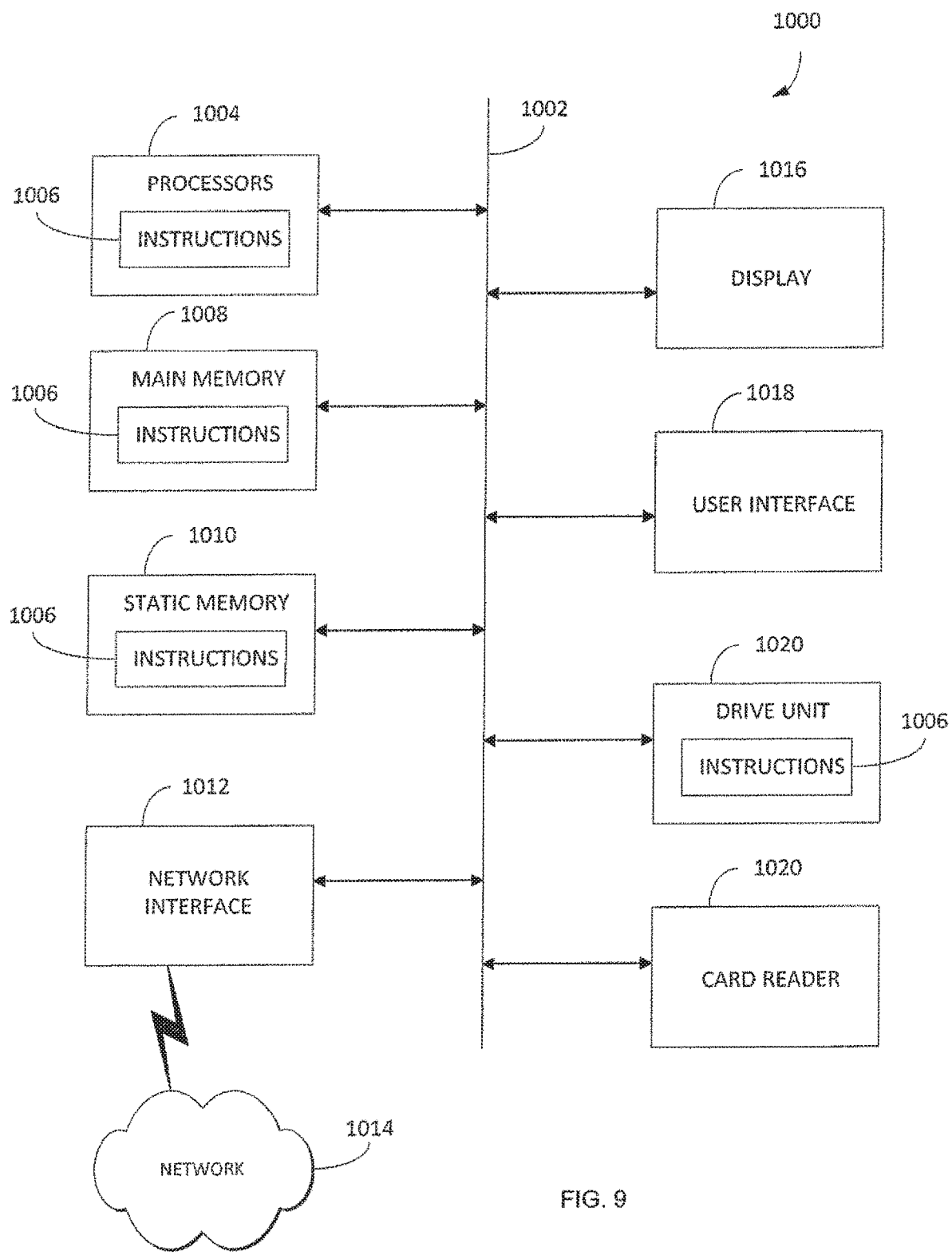
FIG. 9 depicts an example of a computing system used for implementing the capture and replay system.

FIG. 9 shows a computing device 1000 executing instructions 1006 for performing any combination of the operations discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet PC, a Personal Digital Assistant (PDA), a cellular telephone, a web appliance, or any machine capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or portable FLASH key fob. The memory and processing device may be operatively coupled together, or in communication with each other, for example by an I/O port, network connection, etc. such that the processing device may read a file stored on the memory.

Associated memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

For the sake of convenience, operations may be described as various interconnected or coupled functional blocks or diagrams. However, there may be cases where these functional blocks or diagrams may be equivalently aggregated into a single logic device, program or operation with unclear boundaries.

Computing device 1000 can further include a video display 1016, such as a liquid crystal display (LCD) or a cathode ray tube (CRT)) and a user interface 1018, such as a keyboard, mouse, or touch screen. All of the components of computing device 1000 may be connected together via a bus 1002 and/or network.

Having described and illustrated the principles of a preferred embodiment, it should be apparent that the embodiments may be modified in arrangement and detail without departing from such principles. Claim is made to all modifications and variation coming within the spirit and scope of the disclosure.

The invention claimed is:

1. A method for replaying an application session, comprising:
   receiving client events captured from the application session wherein at least one client event is associated with a control field dynamically created and displayed during the application session, wherein the control field is associated with one or more control field attributes including a state change, an identifier, a timestamp, or a user input;
   reproducing image data for the application session from a resource file without requiring capture of the image data during the application session; and
   combining at least some of the client events with the image data to replay the application session by applying the one or more control field attributes to one or more webpages generated from the resource file.

2. The method of claim 1, wherein the resource file comprises code configured to generate an executable application for conducting the application session.

3. The method of claim 1, wherein at least some of the client events are associated with screen view changes.

4. The method of claim 1, wherein the method comprises receiving the client events from a mobile device.

5. The method of claim 1, wherein the method comprises receiving the client events from a tablet computer, a notebook computer or a smartphone.

6. The method of claim 1, wherein the method comprises receiving the client events from a computer.

7. The method of claim 1, wherein the application session comprises a web session.

8. The method of claim 1, wherein the replay of the application session comprises displaying user inputs.

9. The method of claim 1, wherein the replay of the application session comprises displaying user inputs alongside images from the application session.

10. The method of claim 1, wherein the replay of the application session comprises displaying user inputs comprising user selections.

11. The method of claim 1, wherein the replay of the application session comprises displaying user inputs comprising user-entered text or data.

12. The method of claim 1, wherein the replay of the application session comprises displaying user inputs comprising a user-entered password.

13. The method of claim 1, wherein the replay of the application session comprises displaying user inputs comprising user clicks.

14. The method of claim 1, wherein the replay of the application session comprises displaying user inputs comprising user-entered keyboard entries.

15. The method of claim 1, further comprising:
   receiving an image identifier for an image associated with the application session, wherein the image identifier is received from an agent;
   searching a database for an image file associated with the image identifier;
   sending a request to the agent when the image file is not identified in the database;
   receiving the image file from the agent in response to the request; and
   combining the image file with the client events and the image data for replaying the application session.

16. The method of claim 1, further comprising:
   identifying the client events associated with screen view changes;
   identifying Hypertext Markup Language (HTML) generated from the resource file and associated with the screen view changes; and
   reproducing some of the image data based on the HTML.

17. The method of claim 1, further comprising:
   identifying the client events associated with an image change;
   searching for the image data from the resource file associated with the image change;
   generating the image change using the image data from the resource file associated with the image change; and
   generating the image change from the client events when the image data from the resource file is not associated with the image change.

18. The method of claim 1, further comprising:
   identifying the client events identifying a webpage displayed during the application session;
   identifying the image data from the resource file associated with the webpage;
   identifying the client events containing user inputs associated with the webpage;
   rendering the webpage using the image data from the resource file; and
   applying the user inputs to the webpage.

19. The method of claim 1, wherein at least one timestamp identifies either a sequence of one or more electronic pages displayed during the application session, a sequence of user inputs entered into the one or more electronic pages during the application session, how long the one or more electronic pages are displayed during the application session, or how long a user takes to enter inputs into one or more fields of the one or more electronic pages.

20. A computer program product for replaying an application session, the computer program product comprising a non-transitory computer readable storage medium having program code embodied wherewith, the program code readable/executable by a computer to perform a method comprising:
   receiving, by the computer, client events captured from an application session, wherein each of the client events is associated with a screen view change and wherein at least one client event is associated with a control field dynamically created and displayed during the application session, wherein the control field is associated with one or more control field attributes including a state change, an identifier, a timestamp, or a user input;

reproducing, by the computer, image data for the application session from a resource file without requiring capture of the image data during the application session; and combining, by the computer, at least some of the client events with the image data for replaying the application session by applying the one or more control field attributes to one or more webpages generated from the resource file.

21. The computer program product of claim 20, wherein the resource file comprises Extensible Markup Language (XML) code used in combination with application code to generate the executable application.

22. The computer program product of claim 20, wherein the method comprises receiving, by the computer, the client events from a mobile device.

23. The computer program product of claim 20, wherein at least one timestamp identifies either a sequence of one or more electronic pages displayed during the application session, a sequence of user inputs entered into the one or more electronic pages during the application session, how long the one or more electronic pages are displayed during the application session, or how long a user takes to enter inputs into one or more fields of the one or more electronic pages.

24. A system for replaying an application session, comprising:

A memory configured to store image data for an application session; and a processing device configured to:

receive client events captured from an application session wherein at least one client event is associated with a control field dynamically created and displayed during the application session, wherein the control field is associated with one or more control field attributes including a state change, an identifier, a timestamp, or a user input;

reproduce the image data for the application session from a resource file without requiring capture of the image data during the application session; and combine at least some of the client events with the image data to replay the application session by applying the one or more control field attributes to one or more webpages generated from the resource file.

25. The system of claim 24, wherein the processing device is configured to receive the client events from a mobile device.

26. The system of claim 24, wherein at least one timestamp identifies either a sequence of one or more electronic pages displayed during the application session, a sequence of user inputs entered into the one or more electronic pages during the application session, how long the one or more electronic pages are displayed during the application session, or how long a user takes to enter inputs into one or more fields of the one or more electronic pages.

* * * * *